United States Patent
Lobato Peña et al.

(10) Patent No.: US 9,091,245 B2
(45) Date of Patent: Jul. 28, 2015

(54) SYSTEM AND A METHOD FOR SETTING UP, COMMISSIONING AND OPERATING A WIND POWER PLANT

(71) Applicant: Gamesa Innovation & Technology, S.L., Sarriguren (Navarra) (ES)

(72) Inventors: Luis Manuel Lobato Peña, Sarriguren (ES); Pedro Maria Zudaire Latienda, Sarriguren (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 361 days.

(21) Appl. No.: 13/863,945

(22) Filed: Apr. 16, 2013

(65) Prior Publication Data

US 2013/0272844 A1  Oct. 17, 2013

(30) Foreign Application Priority Data

Apr. 17, 2012 (ES) .................................. 201200404

(51) Int. Cl.
*F03D 9/00* (2006.01)
*H02J 3/38* (2006.01)

(52) U.S. Cl.
CPC ................ *F03D 9/002* (2013.01); *H02J 3/386* (2013.01); *Y02E 10/763* (2013.01)

(58) Field of Classification Search
CPC .......... F03D 9/002; H02J 3/386; Y02E 10/763
See application file for complete search history.

(56) References Cited

U.S. PATENT DOCUMENTS

| | | | | |
|---|---|---|---|---|
| 7,761,190 B2 * | 7/2010 | Delmerico et al. | ........... | 700/297 |
| 8,095,244 B2 * | 1/2012 | Morjaria et al. | ............... | 700/287 |
| 8,321,062 B2 * | 11/2012 | Nies et al. | ...................... | 700/287 |
| 8,694,173 B2 * | 4/2014 | Lovmand et al. | ............. | 700/287 |
| 2010/0025995 A1 * | 2/2010 | Lang et al. | ........................ | 290/44 |
| 2010/0145533 A1 * | 6/2010 | Cardinal et al. | ............. | 700/291 |
| 2010/0312409 A1 * | 12/2010 | Zeumer et al. | ................ | 700/287 |
| 2010/0312410 A1 * | 12/2010 | Nielsen | ......................... | 700/287 |
| 2011/0057444 A1 * | 3/2011 | Dai et al. | ......................... | 290/44 |
| 2011/0148114 A1 * | 6/2011 | Garcia | ............................ | 290/44 |

FOREIGN PATENT DOCUMENTS

| | | |
|---|---|---|
| EP | 1 571 746 A1 | 9/2005 |
| EP | 2 375 562 A1 | 10/2011 |
| WO | 2012/019609 A1 | 2/2012 |

* cited by examiner

*Primary Examiner* — Ramesh Patel
(74) *Attorney, Agent, or Firm* — Ladas & Parry LLP (57) ABSTRACT

A system and a method for setting up, commissioning, and operating a wind power plant having a plurality of wind turbine generators (WTGs) operatively connected to a power grid, the system including a reconfigurable power plant controller comprising: a first regulator, a second regulator, and a management system operatively connected to the first and second regulators. The management system comprises a control mode compatibility unit that determines, according to a predefined compatibility table, the compatibility of any new control mode to be selected in one of the regulators with the currently selected control modes, and a control mode prioritization unit that establishes, according to a predefined set of priority rules, the sequence in which the selected control modes are implemented in the regulators.

15 Claims, 7 Drawing Sheets

SYSTEM AND A METHOD FOR SETTING UP, COMMISSIONING AND OPERATING A WIND POWER PLANT

FIELD OF THE INVENTION

The invention relates to a system and a method for setting up, commissioning and operating a wind power plant comprising a plurality of wind turbine generators being operatively connected to a power grid.

BACKGROUND OF THE INVENTION

A wind power plant, also referred to as wind farm, comprises a plurality of wind turbine generators that convert the kinetic energy of the wind into electricity. The collective contributions of all the wind turbine generators amount to the power production of the wind power plant.

The problems associated with the production of electricity in a wind power plant are significantly different from that of other conventional power plants, such as those powered by coal or gas.

First of all, the natural source used in each case has very different behavior. Wind is an intermittent and unpredictable resource, which results in uncertainty about whether the active power production of the wind power plant at a given time is able to cope with an also variable target demand.

Secondly, while in conventional power plants the turbine generators are synchronous machines directly coupled to a power grid, the wind turbine generators may be asynchronous and usually have power converters decoupling the generator from de grid.

A wind power plant is typically connected to a power grid, where other power plants and loads are also connected. The unbalance between the power produced by all power plants and the power demanded by the loads results, for example, in frequency drifts of the voltage, which further complicates the delivery stable power to the grid.

To control electrical variables at the point of connection to the grid the wind power plant requires the use of a regulator.

Some attempts to regulate the electrical variables of a wind power plant operatively connected to a power grid have focused only on regulation of the active power produced by the plant, such as for instance the regulators disclosed in patent publications WO2012/019609 and EP1571746.

Some other attempts have been directed to the regulation of the reactive power loop. In that sense, US2010/0312409 discloses a wind park in which two electrical variables related to the reactive power, namely power factor and voltage, are simultaneously controlled.

In order to make the operation of a wind power plant similar to that of a conventional power plant, simultaneous regulation of the active power loop and of the reactive power loop would be needed.

However, simultaneous regulation is not simple because control modes used in a given regulation loop have a direct effect on the other regulation loop. For instance, power factor control mode or apparent power limitation used in the reactive power regulation loop depend directly on the active power production. Also, the power produced by the wind turbine generators is related to the reactive power capability production through their PQTV curves. Furthermore, active power has an impact on voltage value at grid connection point when the short circuit ratio of the grid is low, or the resistance-to-reactance ratio is high.

Furthermore, user, transmission system operators, or country regulations may require different control modes to be implemented in either the active power regulation loop or in the reactive power regulation loop, or even different control modes being selected at different times.

Some solutions offer some flexibility in the way how an electrical variable of a wind power plant is regulated by allowing the operator to select a control mode.

For example, EP2375562 discloses a wind turbine generator system that comprises two regulators, one that regulates the reactive power and another that regulates the power factor, connected to a control switching unit that allows selection of one of the two control modes. Despite providing some flexibility, this solution only provides a control mode at any given time.

Also, US2011/0148114 discloses a system for operating a wind power plant in which regulation of an electrical variable of the wind power is defined by a model selected from a number of models.

It is an object of the present invention to provide a system and method that can set up, commission and operate a wind power plant so that it behaves like a conventional power plant providing the transmission system operator, or the end users, with the same quality of service as that provided by conventional power plants.

It is another object of the present invention to provide a system and method to operate a wind power plant that allows for simultaneous regulation of the active power loop and the reactive power loop.

It is yet another object of the present invention to present a system and method that makes it possible to operate the wind power plant with higher flexibility and adaptability.

SUMMARY OF THE INVENTION

The object of the present invention is solved with the system of claim 1 and with the method of claim 13. Other embodiments are described in the dependent claims.

The present invention relates to a system for setting up, commissioning and operating a wind power plant having a plurality of wind turbine generators being operatively connected to a power grid. Said system includes a reconfigurable power plant controller comprising:

- a first regulator to regulate the active power at a regulation point of the power grid according to one or more control modes selectable from a first plurality of control modes;
- a second regulator to regulate at least one electrical variable from the group of voltage, power factor and reactive power at a regulation point of the power grid according to one or more control modes selectable from a second plurality of control modes; and
- a management system operatively connected to the first regulator and to the second regulator that dynamically determines the control modes that are simultaneously selected at any given time in the first and second regulators and the parameterization of said control modes based on values of a number of electrical variables of the power grid, command signals, or a schedule.

Said management system comprises:

- a control mode compatibility unit that determines, according to a predefined compatibility table, the compatibility of any new control mode to be selected in one of the first and second regulators with the currently selected control modes; and
- a control mode prioritization unit that establishes, according to a predefined set of priority rules, the sequence in which the selected control modes are implemented in the first and second regulators.

The presence of the management system to ensure the compatibility of the selected control modes and to implement those control modes according to priority rules makes it possible for the power plant controller to achieve simultaneous regulation of the active power loop and the reactive power loop avoiding the drawbacks of the prior-art systems.

Preferably, the first plurality of control modes comprises available active power mode, ramp rate limitation mode, delta control mode, balance control mode, active power production limited mode, active power-frequency control mode and inertia emulation mode.

Preferably, the second plurality of control modes comprises power factor control mode, reactive power control mode, voltage control mode, voltage/reactive power static control mode, power factor/active power control mode, reactive power control mode with active power production approximately equal to zero, apparent power production limited mode and reactive power standby mode.

In some embodiments the first plurality of control modes may comprise a subset of these control modes while in other embodiments will comprise all of them. Similarly, in some embodiments the second plurality of control mode comprises only a subset of the aforementioned control modes.

In a preferred embodiment the first and/or the second plurality of control modes comprises at least the control modes required by an international standard, such as a standard of the International Electrotechnical Commission (IEC).

In a more preferred embodiment the first and/or the second plurality of control modes also comprises the control modes required by one or more national standards of at least one country, and more preferably of two or more countries. In this manner, the system of the present invention can be implemented in wind power plants in different countries without requiring customizing the first and/or second plurality of control modes for each specific country.

Preferably at least two selected control modes in one of the first regulator and the second regulator are implemented at the same time. This situation arises when the control mode compatibility unit of the management system has determined that said modes are not only compatible but that they can be running simultaneously in a given regulator without conflicting with each other.

In some embodiments said at least two selected control modes are control modes of the first regulator. Additionally one of said at least two control modes is active power-frequency control mode or active power production limited mode.

In some other embodiments said at least two selected control modes are control modes of the second regulator and, preferably, one of said at least two control modes is apparent power production limited mode.

In some embodiments of the present invention, the management system suspends the implementation of one of two selected control modes when the other of the two selected control modes is implemented in the same regulator. In this case the control mode compatibility unit sets one of the two control modes in a "sleep mode" while the other control mode is running in a given regulator to avoid conflicts between them.

In one of such embodiments, one of said two selected control modes is preferably reactive power control mode when the active power production is approximately equal to zero.

Preferably the control mode prioritization unit prioritizes the selected control modes of the first regulator over the selected control modes of the second regulator.

In some embodiments, the control mode prioritization unit prioritizes inertia emulation mode over any other selected control mode of the first regulator.

It is advantageous in some embodiments that the control mode prioritization unit prioritizes apparent power production limited mode over any other selected control mode of the second regulator.

Furthermore, it is advantageous in some embodiments that the control mode prioritization unit sets the priority of a selected control mode as a function of an electrical variable of the power grid.

The wind power plant may optionally comprise a substation transformer arranged between the plurality of wind turbine generators and the power grid. In some embodiments the regulation point of the first regulator or the second regulator may advantageously be at the point of common coupling to the power grid. However, in some other embodiments said regulation point may be located in the high-voltage (HV) side, or alternatively the medium-voltage (MV) side, of the substation transformer.

The wind power plant may also comprise a supervisory control and data acquisition unit. Said unit advantageously detects one or more values of a number of electrical variables at a measuring point of the power grid.

In some embodiments, the regulation point of the first regulator and of the second regulator is different from said measuring point. Preferably the regulation point and the measuring point are separated by a transformer or a line. In such cases, the consumption of active power and the production/consumption of reactive power of these elements need to be taken into account by the first regulator and the second regulator respectively in order to regulate at the required point of the power grid.

In an embodiment the first and/or the second regulators are integrated in said supervisory control and data acquisition unit. This is advantageous when the reconfigurable power plant controller does not require fast response time.

However, in another embodiment the first and/or the second regulators are integrated in hardware different from said supervisory control and data acquisition unit. This alternative is preferred when the reconfigurable power plant controller requires fast response time.

In the context of the present application, a fast response time preferably refers to a reaction time of two seconds or less and a settling time of ten seconds or less.

Preferably the management system further comprises:
  a local programming means adapted to program the reconfigurable power plant controller based on command signals received from the supervisory control and data acquisition unit;
  a remote programming means adapted to program the reconfigurable power plant controller based on command signals received from a transmission system operator through digital signals or communications; and
  an automatic programming means adapted to program the reconfigurable power plant controller based on calculations performed with the values of a number of electrical variables of the power grid or based on a schedule.

A method for setting up, commissioning and operating a wind power plant comprising a plurality of wind turbine generators being operatively connected to a power grid, and a reconfigurable power plant controller is also part of the present invention. It comprises the steps of:
  providing a first regulator to regulate the active power at a regulation point of the power grid according to one or more control modes selectable from a first plurality of control modes;

providing a second regulator to regulate at least one electrical variable from the group of voltage, power factor and reactive power at a regulation point of the power grid according to one or more control modes selectable from a second plurality of control modes;

setting up the reconfigurable power plant controller to define its set-up configuration;

commissioning the reconfigurable power plant controller to start operation according to the predefined set-up configuration;

dynamically determining the control modes of the first plurality and second plurality of control modes that need to be simultaneously selected at any given time and the parameterization of said control modes based on values of a number of electrical variables of the power grid, command signals, or a schedule;

determining, according to a predefined compatibility table, the compatibility of any new control mode to be selected in one of the first plurality and second plurality of control modes with the currently selected control modes;

selecting any compatible new control mode in one of the first and second regulators;

establishing a priority sequence for the selected control modes according to a predefined set of priority rules; and configuring the first and second regulators to implement the selected control modes according to the established priority sequence.

Preferably the step of setting up the reconfigurable power plant controller to define its set-up configuration comprises the steps of:

selecting a power grid code depending on the geographical region in which the wind power plant is installed;

determining the required control modes for the first plurality and for the second plurality of control modes based on the power grid code selection;

defining the behavior and parameterization of each of the required control modes;

defining a compatibility table among the required control modes; and defining a set of priority rules among those required control modes that can be simultaneously selected.

Additionally, the step of commissioning the reconfigurable power plant controller to start operation according to the predefined set-up configuration preferably comprises the steps of:

communicating with the transmission system operator;

applying the set-up configuration to the reconfigurable power plant controller;

starting the operation of the wind power plant; and validating the performance of the selected control modes.

BRIEF DESCRIPTION OF THE FIGURES

In the following some preferred embodiments of the invention will be described with reference to the enclosed figures. They are provided only for illustration purposes without however limiting the scope of the invention.

DESCRIPTION OF THE PREFERRED EMBODIMENTS

Figure 1:
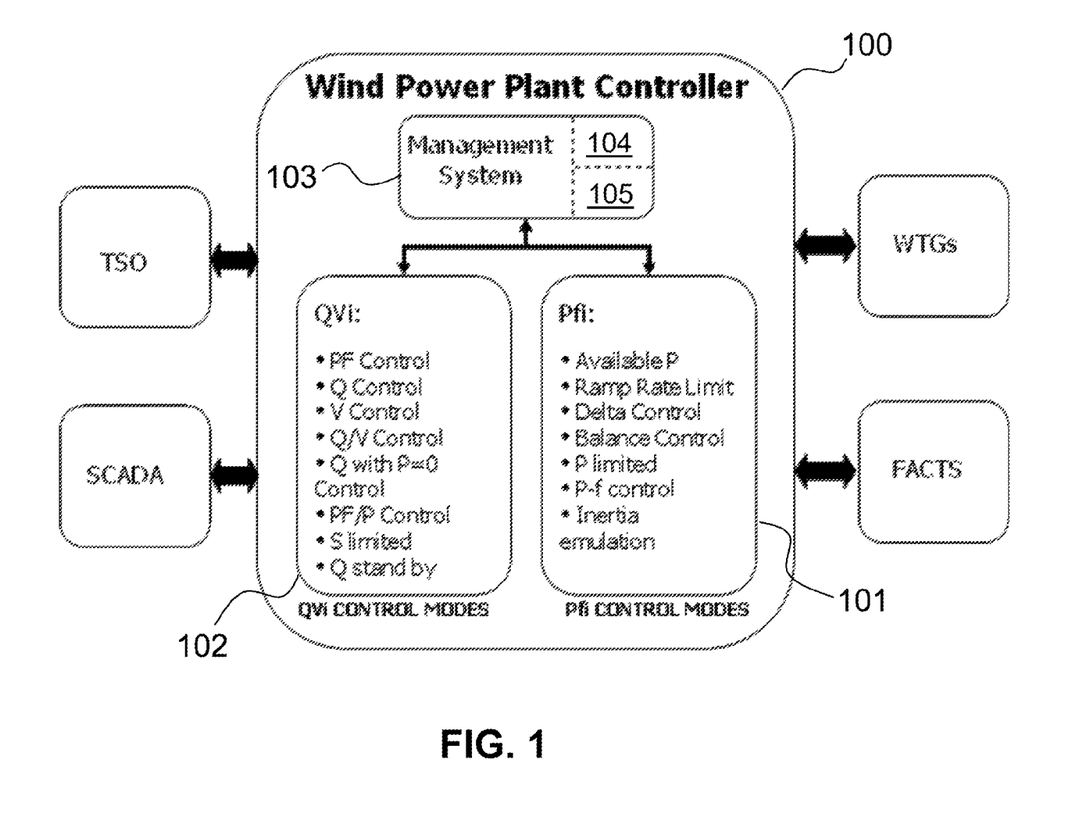
FIG. 1 shows a block diagram of a system for setting up, commissioning and operating a wind power plant according to the present invention.

FIG. 1 presents an embodiment of the system for setting up, commissioning and operating a wind power plant of the present invention, which comprises a reconfigurable power plant controller (100). The wind power plant comprises a plurality of wind turbine generators (WTGs) operatively connected to a power grid (not shown) and to substation auxiliary equipment (FACTS), and may also include capacitor banks or shunt reactors.

The reconfigurable power plant controller (100) comprises a first regulator (101) to regulate the active power at a regulation point of the power grid according to one or more control modes selectable from a first plurality of control modes integrating all control modes needed to control electrical variables according to grid codes and other specifications relating to the active power regulation loop. In the example of FIG. 1, the first plurality of control modes includes: available active power mode (available P), ramp rate limitation mode, delta control mode, balance control mode, active power production limited mode (P limited), active power-frequency control mode (P-f control) and inertia emulation mode.

Additionally, the reconfigurable power plant controller (100) comprises a second regulator (102) to regulate at least one electrical variable from the group of voltage, power factor and reactive power at a regulation point of the power grid according to one or more control modes selectable from a second plurality of control modes integrating all control modes needed to control electrical variables according to grid codes and other specifications relating to reactive power control loop. In this particular example, the second plurality of control modes include: power factor control mode (PF control), reactive power control mode, voltage control mode (V control), voltage/reactive power static control mode (Q/V control), power factor/active power control mode (PF/P control), reactive power control mode with active power production approximately equal to zero (Q with P=0 control), apparent power production limited mode (S limited) and reactive power standby mode (Q standby).

In particular, the second regulator (102) preferably is able to operate with some, or even all, of the following devices: wind turbine generators (WTGs), substation auxiliary equipment (FACTS), capacitor banks, shunt reactors, on load tap chargers (or OLTC), electrical measurement devices, a communication system and control hardware. Since these devices produce (or consume) reactive power, it is advantageous that the second regulator can operate taking these devices into account.

The reconfigurable power plant controller (100) further comprises a management system (103) operatively connected to the first regulator (101) and to the second regulator (102). The management system (103) is capable of setting up the wind power plant, commissioning the plant according a specific local grid code, and operating the plant by dynamically determining the control modes that are simultaneously selected at any given time in the first and second regulators and the parameterization of said control modes based on values of a number of electrical variables of the power grid, command signals, or a schedule. The command signals may be sent locally from a supervisory control and data acquisition unit (SCADA) or remotely from the transmission system operator (TSO).

The management system (103) comprises a control mode compatibility unit (104) to handle compatibilities between control modes in the two regulators (101, 102) according to a predefined compatibility table.

TABLE 1

Compatibility table for control modes of the first regulator (active power regulation loop).

|  | Inertia emulation | P-f control | P Limited | Balance control | Δ control | Ramp Rate Limit. |
|---|---|---|---|---|---|---|
| P available | S | Y | Y | N | N | N |
| Ramp Rate Limitation | S | Y | Y | Y | Y |  |
| Δ control | S | Y | Y | N |  |  |
| Balance control | S | Y | Y |  |  |  |
| P Limited | S | Y |  |  |  |  |
| P-f control | S |  |  |  |  |  |

TABLE 2

Compatibility table for control modes of the second regulator (reactive power regulation loop).

|  | S limited | Q standby | Q with P = 0 | PF/P control | V/Q static | V control | Q control |
|---|---|---|---|---|---|---|---|
| PF control | Y | N | S | N | N | N | N |
| Q control | Y | N | S | N | N | N |  |
| V control | Y | N | S | N | N |  |  |
| V/Q static | Y | N | S | N |  |  |  |
| PF/P control | Y | N | S |  |  |  |  |
| Q with P = 0 | Y | S |  |  |  |  |  |
| Q standby | Y |  |  |  |  |  |  |

Tables 1 and 2 above show an example of a compatibility table among the control modes of the first regulator (101) and among those of the second regulator (102). Moreover, in this example, any control mode of the first regulator (101) can be selected and implemented at the same time with any control mode of the second controller (102).

Each cell in these tables indicates the compatibility between pairs of control modes. When a pair of control modes is not compatible (i.e., the two control modes cannot be both selected), this is indicated with "N". Those pairs that can be selected and simultaneously implemented are denoted with "Y", while those other pairs that can be selected but not simultaneously implemented are identified with "S". In the latter, when one control mode is implemented, the other control mode is suspended ("sleep mode") to avoid conflicts between them.

Moreover, the management system (100) comprises a control mode prioritization unit (105) that establishes, according to a predefined set of priority rules, the sequence in which the selected control modes are implemented in the first and second regulators (101, 102).

In some embodiments, the control mode prioritization unit (105) uses a set of priority rules comprising one or more of the following:

control modes of the first regulator are, by default, prioritized over control modes of the second regulator, all control modes of the second regulator can be implemented at the same time as the control modes of the first regulator except "Q with P=0" control mode if P≠0, inertia emulation mode is always prioritized to any other control mode of the first regulator, P-f control mode is prioritized over P available, ramp rate limitation, delta control, balance control, but not over P limited, among control modes of the first regulator that are implemented at the same time, the minimum value for active power is prioritized, S limited control mode has priority over other control modes of the second regulator, and Q with P=0 control mode has priority over the other modes of the second regulator only when P=0 (with P=0 being wind farm stopped).

In some embodiments the control modes for the first regulator (101) and for the second regulator (102) are compatible with environmental protection systems at wind farm level, such as ice detection system, wake cancellation system, shadow control system and noise reduction system.

In these embodiments, the control mode prioritization unit (105) prioritizes, by default, the environmental protection systems over the control modes of the first regulator (101) and of the second regulator (102).

In a preferred embodiment, the selected control modes in the first regulator (101) comprise active power-frequency control mode and at least one of available active power mode and inertia emulation mode.

In another preferred embodiment, delta control mode is selected in the first regulator (101) and apparent power production limited mode is selected in the second regulator (102).

Finally, when a change in a control mode is requested, the management system (103) may preferably be also capable of handling transitions between control modes in a smooth way, avoid unnecessary zero-pass and oscillation.

Figure 2:
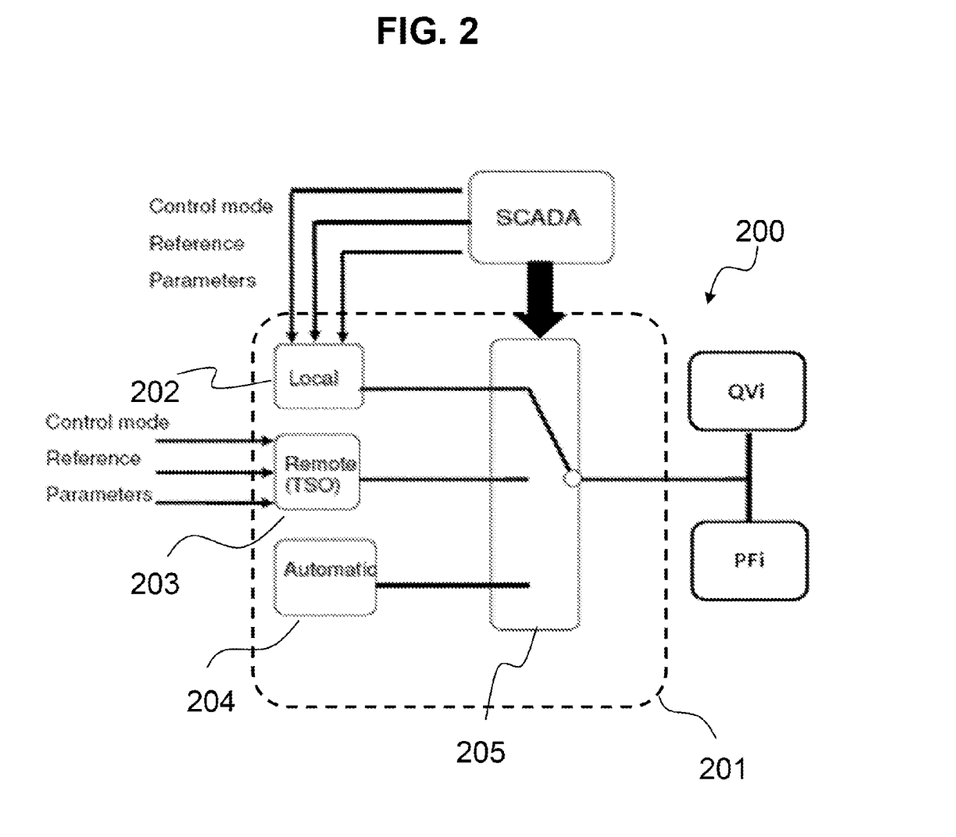
FIG. 2 shows a block diagram of an embodiment of a reconfigurable power plant controller.

Referring now to FIG. 2, it is there shown a block diagram of a preferred embodiment of a reconfigurable power plant controller (200) that comprises a first regulator (PFi) and a second regulator (QVi). A management system (201) is operatively connected to both regulators to dynamically determine the selected control modes in the regulators.

The management system (201) comprises a local programming means (202) that makes it possible to program the reconfigurable plant controller based on command signals that a user can send to the local programming means (202) by means of a supervisory control and data acquisition unit (SCADA) of the wind power plant. The management system (201) also comprises a remote programming means (203) to allow such programming but alternatively based on command signals received from a transmission system operator through digital signals or communications.

The command signals received by the local programming means (202) or the remote programming means (203) may be related to one or more of the following:

a request to select or deselect a control mode of one of the first regulator (PFi) and the second regulator (QVi), a change in a reference value for a selected control mode, or a change in the parameterization of selected control mode.

Finally, the management system (201) further comprises an automatic programming means (204) to program the reconfigurable power plant controller. Such automatic programming may be based on calculations performed with the values of a number of electrical variables of the power grid (e.g., a selection of a control mode may be automatically triggered when a parametrical variable reaches a certain reference value, which may also be parametrically defined) or based on a schedule (e.g., setting a date and time at which a given control mode is to be selected).

The management system (201) comprises a selector (205) to determine which one of the three programming means (202, 203, 204) is operatively connected at a given time to the first and second regulators (PFi, QVi). Such selector (205) is advantageously controlled by the user from the supervisory control and data acquisition unit (SCADA). In some examples, the selector (205) is set by default to operatively connect the local programming means (202) to the first and second regulators (PFi, QVi).

Figure 3:
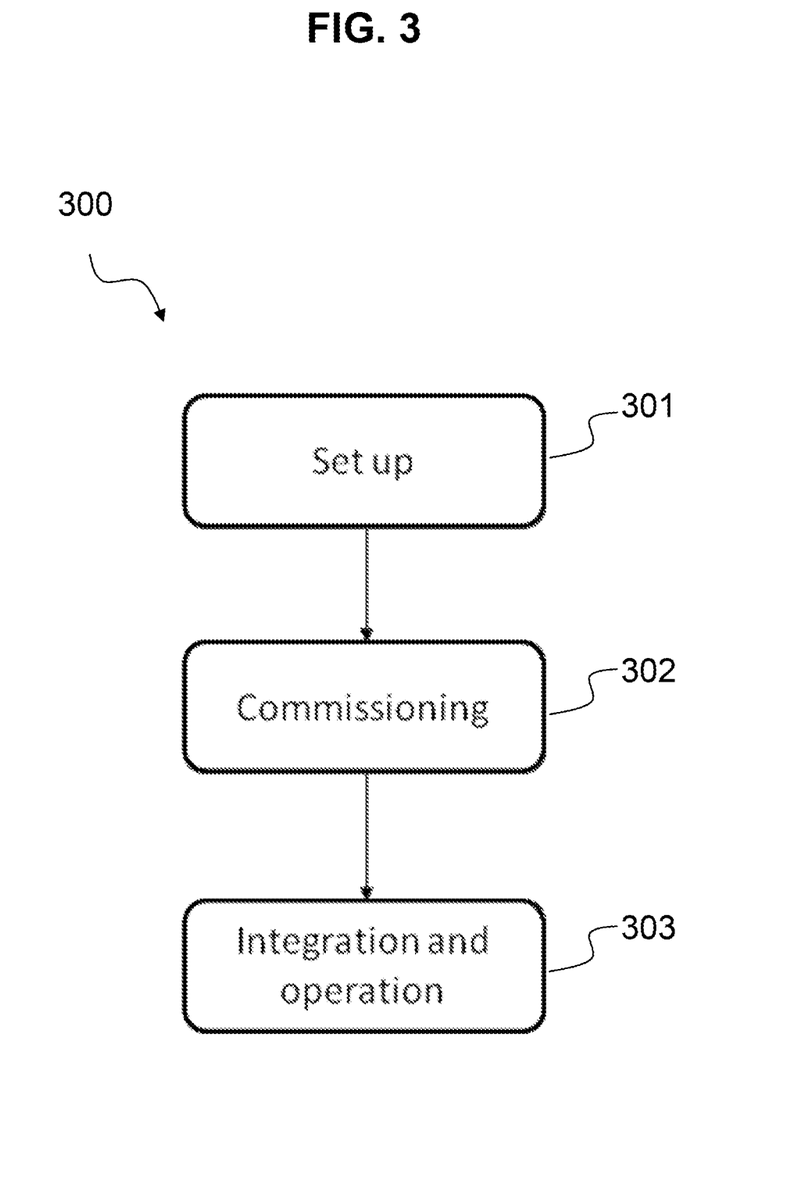
FIG. 3 shows a flowchart relating to the method for setting up, commissioning and operating a wind power plant in accordance with the present invention.

FIG. 3 depicts a flowchart with the method to set up, commission and operate a wind power plant of the present invention. A method (300) comprises the steps of:
  setting up the reconfigurable power plant controller (301);
  commissioning of the system (302),
    integrating a first regulator associated to the active power loop and a second regulator associated to the reactive power loop and dynamically handling compatibilities and priorities between control modes (303), and.
  operating the wind power plant with such reconfigurable power plant controller (303).

Figure 4:
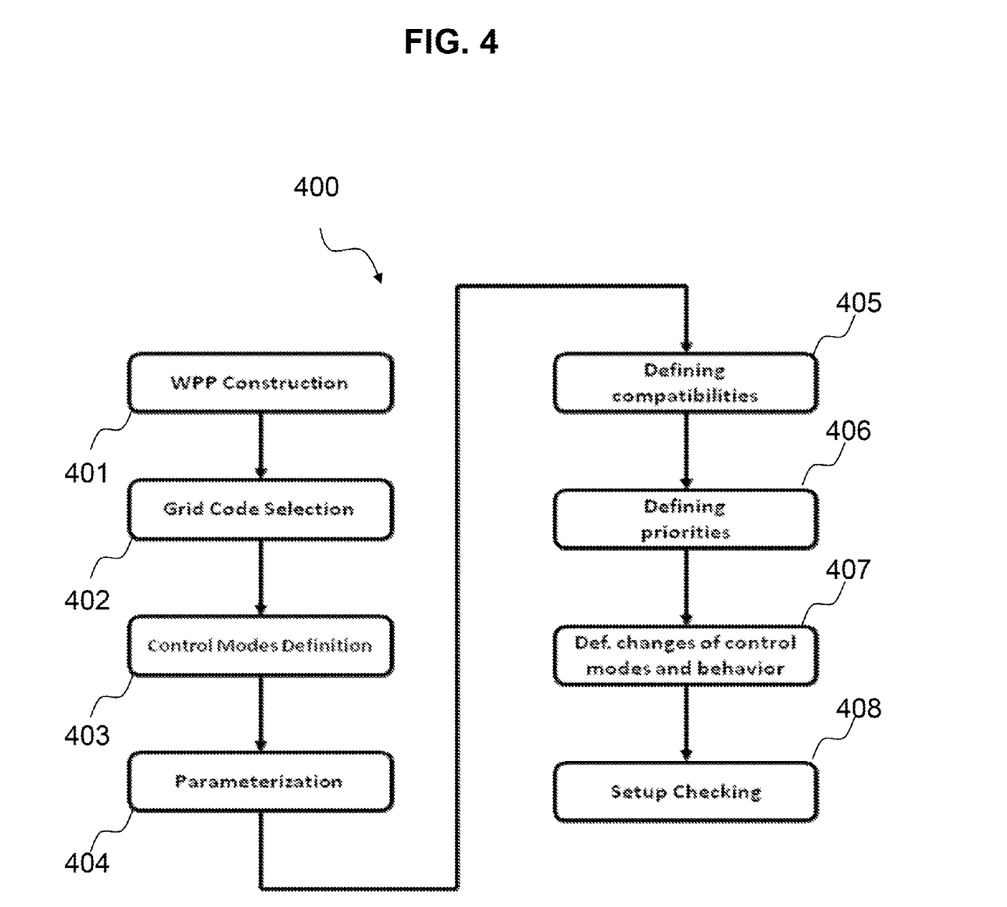
FIG. 4 shows a flowchart of an exemplary step of setting up the reconfigurable power plant controller to define its set-up configuration.

Referring now to FIG. 4, it is there shown a flowchart illustrating an exemplary implementation of the set-up of the reconfigurable power plant controller. In particular, the step of setting up said controller (400) comprises:
  providing the reconfigurable power plant controller in a wind power plant (401).
  selecting a power grid code (402) depending on the geographical region in which the wind power plant is installed,
  determining the required control modes (403) for the first and second plurality of control modes needed to fulfill the requirements of the selected power grid code,
  defining the behavior of the system for the required control modes and their parameterization (404),
  defining a compatibility table among the required control modes (405), and
  defining a set of priority rules among those required control modes that can be simultaneously selected (406).

If, for example, the power grid code of Ireland is selected, then compliance with normative documents EIRGRID Grid Code v3.4 and ESB Networks Distribution Code v2.0 is required, which means that the first plurality of control modes requires at least P available mode, ramp rate limitation, balance control and P-f control and that the second plurality of control modes requires at least PF control, V control, V/Q static control and Q standby control.

In FIG. 4, the step of setting up the reconfigurable power plant controller (400) further comprises defining values of electrical parameters that entail a change in a currently selected control mode or of a reference value used in a control mode (407). Such values can be related to power grid conditions, wind power plant conditions or transmission system operator requirements, and permit the wind power plant to operate automatically and in real time. Additionally, the behavior of the system against a change in control mode needs also to be defined.

Finally, the step of setting-up the reconfigurable power plant controller may optionally comprise checking the set-up configuration (408) to ensure the correct initialization of the system.

Figure 5:
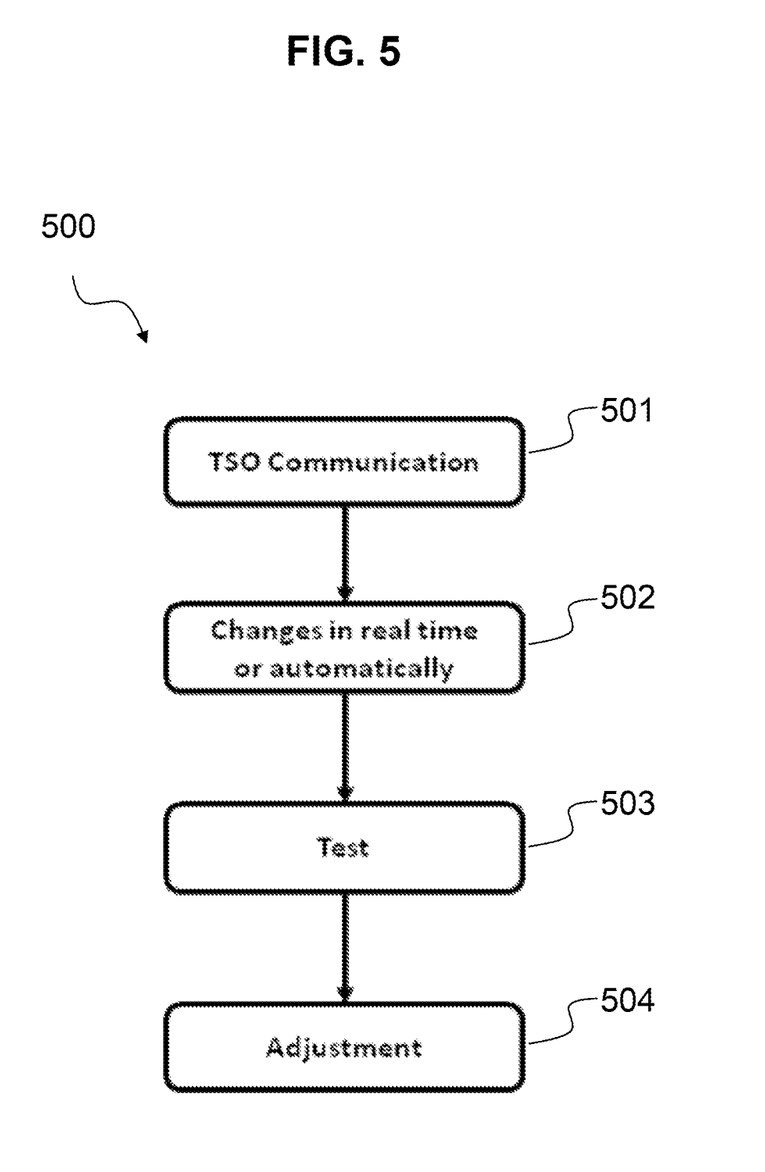
FIG. 5 shows a flowchart of an exemplary step of commissioning the reconfigurable power plant controller to start operation according to the predefined set-up configuration.

FIG. 5 illustrates by means of a flowchart a possible implementation of the step of commissioning the reconfigurable power plant controller. Said commissioning of the controller (500) comprises communicating with the transmission system operator (501), applying the set-up configuration to the reconfigurable power plant controller (502) and starting its operation, and validating the performance of the selected control modes (503).

When applying the set-up configuration to the controller (502), it is possible to make changes in the control modes and their parameterization. Such changes can be made in real time by means of command signals sent by the transmission system operator (TSO). Alternatively, these changes can be automatically triggered by, for example, a schedule.

Additionally, the step of commissioning the reconfigurable power plant controller (500) shown in FIG. 5 further comprises adjusting the parameterization of the selected control modes (504). Such adjustment can be, for instance, in response to the unsatisfactory performance of the control modes upon validation (503).

Figure 6:
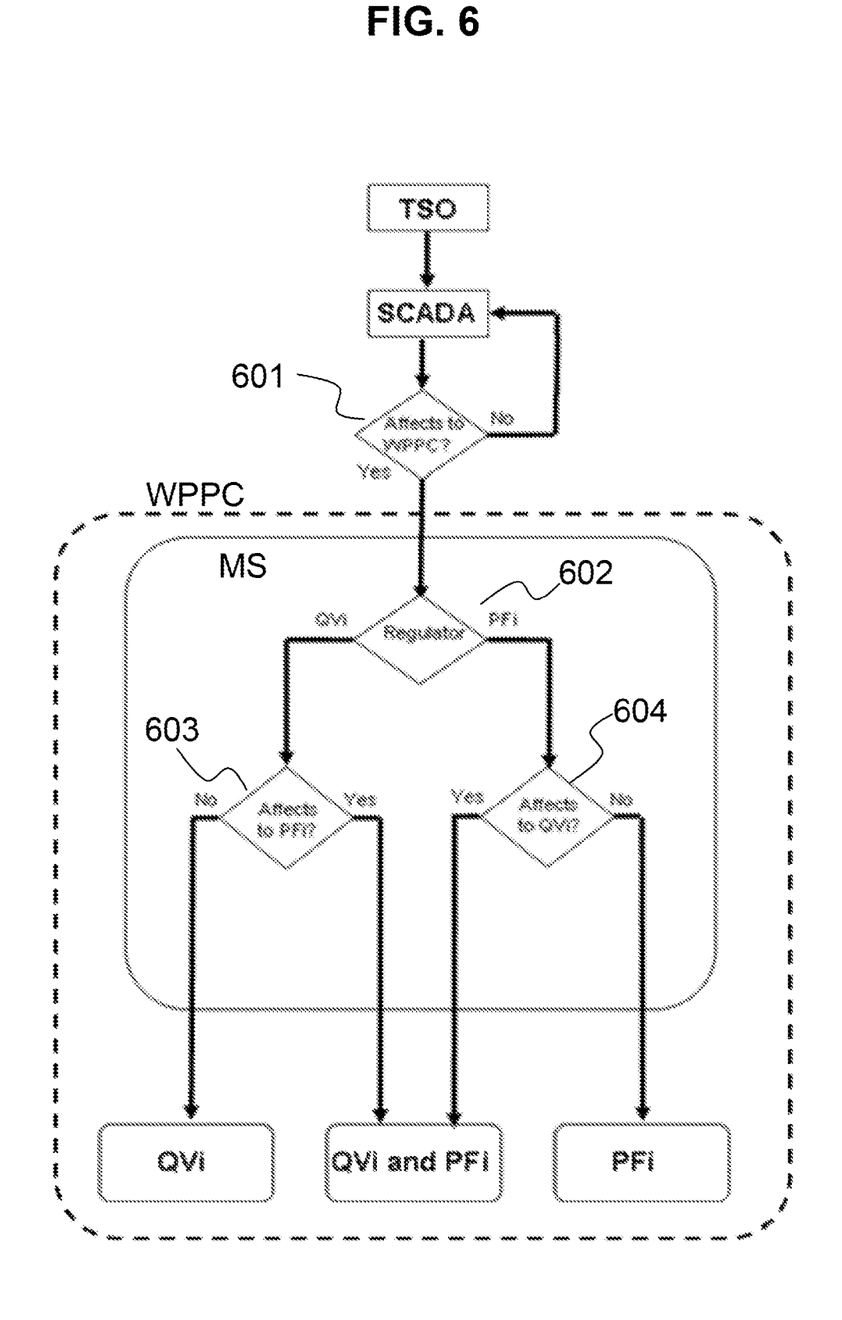
FIG. 6 shows a flowchart illustrating a first example of the reconfigurable power plant controller during operation.

An embodiment of the reconfigurable power plant controller during operation is represented by means of the flowchart of FIG. 6.

During operation of the wind power plant, the transmission system operator (TSO) may send a command signal to the reconfigurable power plant controller (WPPC) through, for example, the supervisory control and data acquisition unit (SCADA). The SCADA receives the command signal and a first decision means (601) determines whether the incoming command signal is addressed to the reconfigurable power plant controller (WPPC) and, if so, the command signal is directed to the management system (MS).

In the management system (MS) the control mode compatibility unit determines the compatibility of any control mode requested in the command signal with the currently selected control modes. Furthermore, second decision means (602) establish whether the command signal is directed to the first regulator (PFi) or to the second regulator (QVi).

Next, third decision means (603) and fourth decision means (604) determine whether applying a change in one of the two regulators (PFi, QVi) affects the current operation of the other. With this information, the control mode prioritization unit can establish the sequence in which the selected control modes are to be implemented in the regulators (PFi, QVi). Finally, the management system (MS) updates the configuration of only one regulator or both regulators accordingly.

In the following paragraphs some specific examples are provided to better illustrate the operation of the reconfigurable power plant controller that forms part of the system according to the present invention.

In a first example, the wind power plant is already in operation. The first regulator (PFi) is currently implementing delta control while the second regulator (QVi) is currently implementing Q control.

Due to a short-circuit in an overhead line close to the wind power plant, the transmission system operator (TSO) sends to the wind power plant the command signal to limit maximum apparent power that can be produced. The transmission system operator (TSO) may send said command signal to the wind power plant operator, for him to program the reconfigurable power plant controller locally, or alternatively send said command signal directly to the reconfigurable power plant controller using a defined protocol for remote programming.

The supervisory control and data acquisition unit (SCADA) receives the command signal and the first decision means (601) establishes that it relates to the reconfigurable power plant controller (WPPC), and hence the command signal reaches the management system (MS).

The management system (MS) analyses the compatibility of the new control mode to be selected (i.e., S limitation) with currently selected control modes (i.e., Q control and delta control). If for example Tables 1 and 2 are used to define the compatibility table), then the three modes can be simultaneously selected.

Once established the compatibility among the modes, the second decision means (602) determines that the command signal, namely apparent power limitation, is directed to the second regulator (QVi).

Then the third decision means (603) determines whether this new control mode affects the first regulator (PFi). Indeed, this is the case as apparent power is affected by active power. The management system needs to establish a priority sequence according to some predefined rules in which delta control comes first, apparent power limitation second and Q control last.

Figure 7:
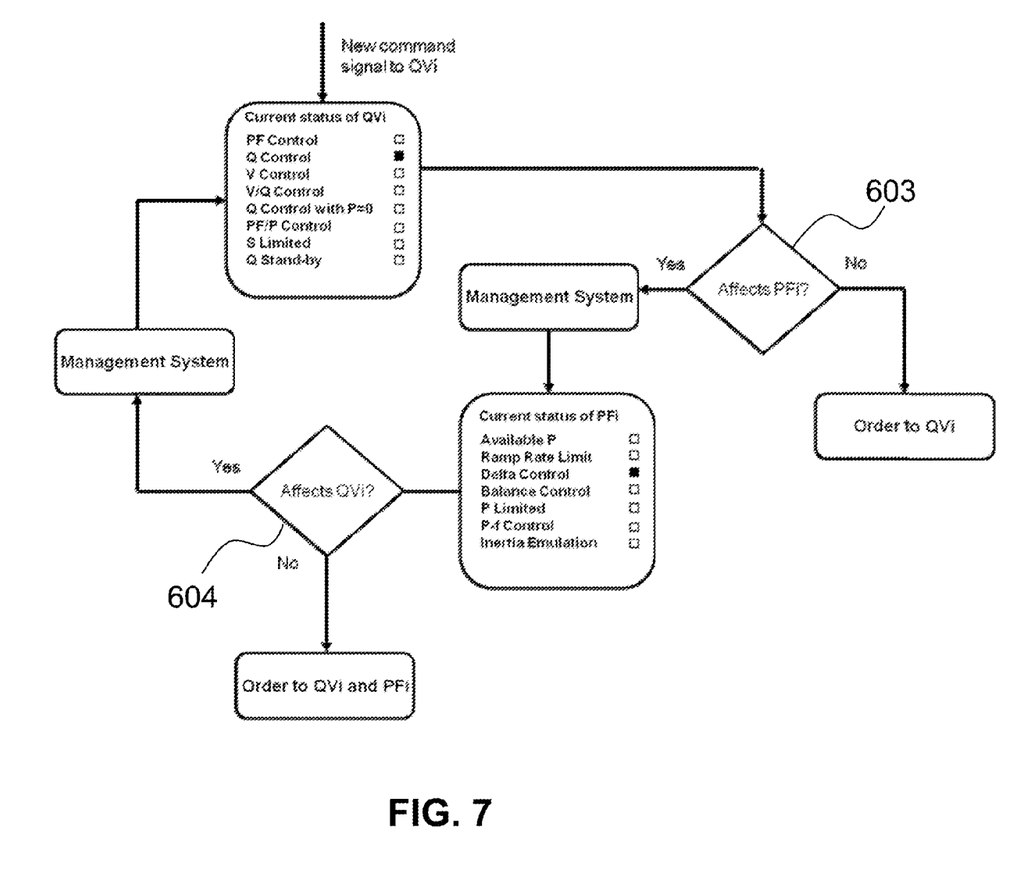
FIG. 7 shows a flowchart with an alternative example of the reconfigurable power plant controller during operation.

As an alternative within this same example, the management system may act as illustrated in the flowchart of FIG. 7, in which once the third decision means (603) determines that a command signal directed to the second regulator (QVi) also affects the first regulator (PFi) then the fourth decision means (604) establishes whether the necessary changes to the configuration of the first regulator (PFi) imply an additional change to the configuration of the second regulator (QVi). Consequently, and in order to ensure the compatible operation of the two regulators, the changes applied in the configuration of the second regulator (QVi) may differ from what it was requested with the command signal.

In a second example, a wind power plant is functioning with its wind turbine generators producing according to wind resource with power reserve of 700 kW approximately.

In the reconfigurable power plant controller (WPPC), the first regulator (PFi) currently implements P-f control, while the second regulator (QVi) implements Q control with a reference value set to the wind turbine generators of 250 kVAr.

In case of a sudden frequency drop in the power grid, the first regulator (PFi) could set a reference value to the wind turbine generators to increase active power produced up to 800 kW, reducing the active power reserve.

However, since the PQTV curves of the wind turbine generators indicate that they are not capable of producing 800 kW and 250 kVAr at the same time, the management system defines the priority sequence in which to implement the control modes in the first regulator (PFi) and in the second regulator (QVi) depending on a predefined parameterization.

In yet another example of a system according to the present invention, a wind power plant deployed in the United Kingdom is designed to be able to operate different control modes at the same time.

In particular, the first regulator (PFi) can select control modes from a first plurality of control modes comprising P available mode, ramp rate limitation, delta control, balance control, P limited mode, P-f control and inertia emulation. Moreover, the second regulator (QVi) can select control modes from a second plurality of control modes comprising PF control, Q control and VQ static control.

Since at some time more than one control mode can be selected in each regulator, the management system (MS) must resolve the prioritization of currently selected control modes and ensure the correct operation of the wind power plant. That is, the wind power plant fulfills the National Grid requirements defined for the United Kingdom.

For instance, the first regulator (PFi) of the reconfigurable power plant controller (WPPC), at a given time, may be required to limit active power ramps (i.e., ramp rate limitation), regulate P-f, and emulate inertia.

The management system (MS) verifies that, according to a predefined compatibility table (e.g., Table 1), the three control modes can be simultaneously selected although inertia emulation cannot be concurrently implemented with ramp rate limitation and P-f control. Then, the management system (MS) establishes a priority sequence according to some predefined rules in which inertia emulation is prioritized over the other two control modes.

Generally, all terms used in the claims are to be interpreted according to their ordinary meaning in the technical field, unless explicitly defined otherwise herein. In addition, singular references (e.g., "a", "an", "first", "second") do not exclude a plurality. Further, the steps of any method disclosed herein do not have to be performed in the exact order disclosed, unless explicitly stated.

While the invention has been described with respect to specific examples including presently preferred modes of carrying out the invention, those skilled in the art will appreciate that there are numerous variations and permutations of the above described system and method, including substitution of specific elements by others technically equivalent, without departing from the scope of the invention as set forth in the appended claims.

The invention claimed is:

1. A system for setting up, commissioning and operating a wind power plant having a plurality of wind turbine generators (WTGs) being operatively connected to a power grid, the system including a reconfigurable power plant controller (100, 200, WPPC) comprising:
   a first regulator (101, PFi) to regulate the active power at a regulation point of the power grid according to one or more control modes selectable from a first plurality of control modes;
   a second regulator (102, QVi) to regulate at least one electrical variable from the group of voltage, power factor and reactive power at a regulation point of the power grid according to one or more control modes selectable from a second plurality of control modes;
   a management system (103, 201, MS) operatively connected to the first regulator and to the second regulator that dynamically determines the control modes that are simultaneously selected at any given time in the first and second regulators and the parameterization of said control modes based on values of a number of electrical variables of the power grid, command signals, or a schedule;
   wherein the management system comprises
   a control mode compatibility unit (104) that determines, according to a predefined compatibility table, the compatibility of any new control mode to be selected in one of the first and second regulators with the currently selected control modes; and
   a control mode prioritization unit (105) that establishes, according to a predefined set of priority rules, the sequence in which the selected control modes are implemented in the first and second regulators.

2. The system according to claim 1, wherein the first plurality of control modes comprises available active power mode, ramp rate limitation mode, delta control mode, balance control mode, active power production limited mode, active power-frequency control mode and inertia emulation mode.

3. The system according to claim 1, wherein the second plurality of control modes comprises power factor control mode, reactive power control mode, voltage control mode, voltage/reactive power static control mode, power factor/active power control mode, reactive power control mode with active power production approximately equal to zero, apparent power production limited mode and reactive power standby mode.

4. The system according to claim 1, wherein at least two selected control modes in one of the first regulator (101, PFi) and the second regulator (102, QVi) are implemented at the same time, and
wherein preferably one of said at least two control modes is active power-frequency control mode, active power production limited mode, or apparent power production limited mode.

5. The system according to claim 1, wherein the management system (103, 201, MS) suspends the implementation of one of two selected control modes when the other of the two selected control modes is implemented in the same regulator, and
wherein preferably one of the two selected control modes is reactive power control mode when the active power production is approximately equal to zero.

6. The system according to claim 1, wherein the control mode prioritization unit (105) prioritizes the selected control modes of the first regulator (101, PFi) over the selected control modes of the second regulator (102, QVi).

7. The system according to claim 1, wherein the control mode prioritization unit (105) prioritizes inertia emulation mode over any other selected control mode of the first regulator (101, PFi); and/or
wherein the control mode prioritization unit (105) prioritizes apparent power production limited mode over any other selected control mode of the second regulator (102, QVi); and/or
wherein the control mode prioritization unit (105) sets the priority of a selected control mode as a function of an electrical variable of the power grid.

8. The system according to claim 1, wherein the wind power plant comprises a substation transformer arranged between the plurality of wind turbine generators (WTGs) and the power grid, and wherein the regulation point of the first regulator or the second regulator is at the point of common coupling to the power grid.

9. The system according to claim 1, wherein the wind power plant comprises a supervisory control and data acquisition unit (SCADA), wherein said unit detects one or more values of a number of electrical variables at a measuring point of the power grid, and wherein optionally the regulation point of the first regulator (101, PFi) and of the second regulator (102, QVi) is different from the measuring point.

10. The system according to claim 9, wherein the management system (201) further comprises:
a local programming means (202) adapted to program the reconfigurable power plant controller (200) based on command signals received from the supervisory control and data acquisition unit (SCADA);
a remote programming means (203) adapted to program the reconfigurable power plant controller (200) based on command signals received from a transmission system operator through digital signals or communications; and
an automatic programming means (204) adapted to program the reconfigurable power plant controller (200) based on calculations performed with the values of a number of electrical variables of the power grid or based on a schedule.

11. The system according to claim 1, wherein the selected control modes in the first regulator (101, PFi) comprise active power-frequency control mode and at least one of available active power mode and inertia emulation mode.

12. The system according to claim 1, wherein delta control mode is selected in the first regulator (101, PFi) and apparent power production limited mode is selected in the second regulator (102, QVi).

13. A method for setting up, commissioning and operating a wind power plant comprising a plurality of wind turbine generators (WTGs) being operatively connected to a power grid and a reconfigurable power plant controller (100, 200, WPPC), the method comprising the steps of:
providing a first regulator (101, PFi) to regulate the active power at a regulation point of the power grid according to one or more control modes selectable from a first plurality of control modes;
providing a second regulator (102, QVi) to regulate at least one electrical variable from the group of voltage, power factor and reactive power at a regulation point of the power grid according to one or more control modes selectable from a second plurality of control modes;
setting up the reconfigurable power plant controller to define its set-up configuration (400);
commissioning the reconfigurable power plant controller to start operation according to the predefined set-up configuration (500);
dynamically determining the control modes of the first plurality and second plurality of control modes that need to be simultaneously selected at any given time and the parameterization of said control modes based on values of a number of electrical variables of the power grid, command signals, or a schedule
determining, according to a predefined compatibility table, the compatibility of any new control mode to be selected in one of the first plurality and second plurality of control modes with the currently selected control modes;
selecting any compatible new control mode in one of the first and second regulators (101, PFi, 102, QVi);
establishing a priority sequence for the selected control modes according to a predefined set of priority rules; and
configuring the first and second regulators (101, PFi, 102, QVi) to implement the selected control modes according to the established priority sequence.

14. The method of claim 13, wherein the step of setting up the reconfigurable power plant controller to define its set-up configuration comprises the steps of:
selecting a power grid code (402) depending on the geographical region in which the wind power plant is installed;
determining the required control modes (403) for the first plurality and for the second plurality of control modes based on the power grid code selection;
defining the behavior and parameterization of each of the required control modes (404);
defining a compatibility table among the required control modes (405); and
defining a set of priority rules among those required control modes that can be simultaneously selected (406).

15. The method of claim 13, wherein the step of commissioning the reconfigurable power plant controller to start operation according to the predefined set-up configuration comprises the steps of:
communicating with the transmission system operator (501);
applying the set-up configuration to the reconfigurable power plant controller (502);
starting the operation of the wind power plant; and validating the performance of the selected control modes (503).

\* \* \* \* \*